United States Patent

[11] 3,621,028

| [72] | Inventor | Robert Anthony Newberry<br>Bourne End, England |
|---|---|---|
| [21] | Appl. No. | 814,444 |
| [22] | Filed | Apr. 8, 1969 |
| [45] | Patented | Nov. 16, 1971 |
| [73] | Assignee | John Wyeth & Brother Limited<br>Taplow, Maidenhead, Berkshire, England |
| [32] | Priority | Apr. 9, 1968 |
| [33] | | Great Britain |
| [31] | | 16,909/68 |

[54] CERTAIN $\Delta^2$-THIAZOLINEALKANOIC ACIDS AND ESTERS
10 Claims, No Drawings

[52] U.S. Cl..................................................... 260/306.7,
260/483, 260/539 R, 260/552 R, 424/270

[51] Int. Cl...................................................... C07d 11/24
[50] Field of Search........................................... 260/306.7

[56] References Cited
UNITED STATES PATENTS
3,147,273  9/1964  Szmuszkovicz...............  260/306.7

Primary Examiner—Alex Mazel
Assistant Examiner—R. J. Gallagher
Attorney—Dwight J. Potter ABSTRACT: This invention concerns 2-cycloalkyl or aryl-4-hydroxy-2-thiazoline-4 and 5-alkanoic acids which are pharmacologically efficacious as anti-inflammatory agents and which are useful as intermediates in the preparation of the corresponding thiazoles.

CERTAIN Δ²-THIAZOLINEALKANOIC ACIDS AND ESTERS

This invention relates to novel nitrogen and sulfur containing heterocyclic compounds. In particular it concerns 2-cycloalkyl or ary-4-hydroxy-2-thiazoline-4 and 5-alkanoic acids which in standard pharmacological test procedures with laboratory animals exhibit usefulness as anti-inflammatory agents. The compounds are also useful in the preparation of pharmacologically active 2-cycloalkyl-or arylthiazole-4- and 5-alkanoic acids.

The invention provides novel 4-hydroxy-2-thiazoline-4 and 5-alkanoic acids and their esters of general formula I

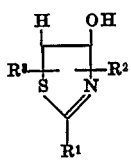

I wherein $R^1$ is selected from the group consisting of cycloloweralkyl, phenyl, substituted phenyl such as loweralkylphenyl, loweralkoxyphenyl, halophenyl, nitrophenyl, diloweralkylaminophenyl and trifluoromethylphenyl, naphthyl and heterocyclyl such as thienyl and furyl; $R^3$ is selected from the group consisting of hydrogen and lower alkyl and $R^2$ is a group selected from lower alkanoic acid residues and their lower alkyl esters at the 4- and 5- positions while the group $R^3$ is at the other of said positions, and acid addition salts thereof.

The terms "loweralkyl," "loweralkoxy" and the like are meant to include both branched and straight chain moieties having from 1 to about 6 carbon atoms.

The compounds of general formula I, in the form of a hydrohalide may be prepared by reacting a compound of the general formula

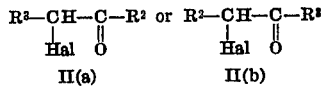

with a thioamide of the general formula

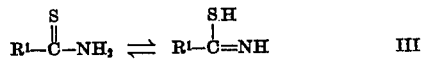

where $R^1$, $R^2$ and $R^3$ have the meanings defined above and Hal is a halogen atom, under mild conditions. The temperatures used for the reaction must be below the dehydration temperature of the thiazoline hydrohalide. The optimum temperature will therefore depend on the particular reactants used and temperatures below 50° C. such as room temperature are preferred. It is also preferable to carry out the reaction in an inert organic solvent in which the thiazoline hydrohalide is insoluble. If $R^2$ is an aliphatic acid group and if the reaction is carried out in a lower alkanol such as isopropanol in the presence of a base such as an alkali metal carbonate, the free thiazoline aliphatic acid can be obtained. On the other hand it is generally more convenient to use a reactant in which $R^2$ is a lower alkyl ester of an aliphatic acid, e.g. the ethyl ester. Conveniently equimolar amounts of the reactants are used and the reaction mixture is heated to the required temperature or in some cases is merely kept at room temperature for a short time or overnight. The thiazolines provided by the invention can be separated in known manner, e.g. by filtration, and the filtrate may be acidified to precipitate additional product. The free bases of the thiazolines can be prepared from the hydrohalides by treatment with a base, e.g. with an alkali metal carbonate.

The starting compounds II employed in the above reaction are either commercially available or are readily prepared by organic procedures well known to the art.

In the preparation of 4-hydroxy-thiazoline-4-acetic acids the γ-halo-acetoacetic acid is, of course, protected in conventional manner to prevent decarboxylation and after the cyclization reaction the protecting group is conventionally removed, for instance using a benzyl ester which is removed by catalytic hydrogenation.

When the 4-hydroxy-thiazolines of the invention are employed as intermediates to prepare the corresponding thiazoles, they can be dehydrated by heating to above the dehydration temperature, particularly in the presence of an acid. The 4-hydroxythiazolines of the invention are readily dehydrated on heating when in the form of a hydroacid salt, the free bases being more stable. Dehydration may be effected by refluxing the compound in the presence or of an organic solvent in the presence of a sulfonic acid, e.g. benzene sulfonic acid or p-toluene sulfonic acid using a water separator until water is no longer evolved, or more simply by heating in an alkanoic acid such as glacial or aqueous acetic acid. When the reaction is complete the thiazole can be recovered conventionally, for instance the reaction mixture can be evaporated to reduced volume and the product crystallized from a solvent, for instance an alcohol. The thiazoles in general are anti-inflammatory agents when tested on warm-blooded animals such as by the tests of Winter et al. in Proc. Soc. Biol. Med. III, 544 (1962) and Buttle et al. in Nature, 179, 629 (1957).

As the compounds of general formula (I) generally show pharmaceutical activity, for example, anti-inflammatory activity, the invention provides a pharmaceutical composition comprising a compound of general formula (I), or an acid addition salt thereof, and a pharmaceutically acceptable carrier.

When the compounds of this invention are employed as anti-inflammatory agents they can be administered to warm-blooded animals, e.g. mice, rats, rabbits, dogs, cats, monkeys, etc. alone or as a pharmaceutical composition in combination with pharmaceutically acceptable carriers. The carrier may be solid, liquid or creamlike and any suitable carrier known to the art can be used. The composition can be in unit dose form, for example as tablets or capsules or it can be in the form of a solution. The compositions can be administered orally or parenterally by injection and the composition can, for parenteral administration, be in the form of a sterile solution or suspension containing other solutes, for example enough saline or glucose to render the solution isotonic. The particular carrier and proportion of carrier to active compound will be determined by the nature of the compound, the chosen route of administration and standard pharmaceutical practice.

The dosage of the thiazoline will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects. The following examples illustrate the invention:

EXAMPLE 1

Ethyl 4-hydroxy-2-phenyl-2-thiazolin-4-acetate hydrobromide

Ethyl 4-bromo-3-oxobutyrate (5 g.) in acetone (10 ml.) is added to thiobenzamide (3.3 g.) in acetone (50 ml.). After 16 hours at room temperature, the required hydrobromide salt is filtered off (2.0 g., 24 percent) m.p. 77°–78° C.
Analysis: Found: C, 44.8; H, 4.8; N, 4.0. $C_{13}H_{16}BrNO_3S$, requires C, 45.1; H, 4.7; N, 4.0 percent.

In a similar manner, the following thioamides give the hydrobromide product indicated, using the above-named ester reactant.

| Thioamide | Product |
|---|---|

| | | |
|---|---|---|
| Cyclohexyl thiocarboxamide | Ethyl 4-hydroxy-2-cyclohexyl-2-thiazoline-4-acetate | |
| p-Bromothiobenzamide | Ethyl 4-hydroxy-2-(p-bromophenyl)-2-thiazoline-4-acetate | |
| p-Chlorothiobenzamide | Ethyl 4-hydroxy-2-(p-chlorophenyl)-2-thiazolin-4-acetate | |
| p-Fluorothiobenzamide | Ethyl 4-hydroxy-2-(p-fluorophenyl)-2-thiazolin-4-acetate | |
| m-Trifluoromethylthiobenzamide | Ethyl 4-hydroxy-2-(m-trifluoromethylphenyl)-2-thiazolin-4-acetate | |
| (o-, m- or p-) Methylthiobenzamide | Ethyl 4-hydroxy-2-(o-, m- or p-tolyl)-2thiazoline-4-acetate | |
| p-Nitrophenylthiobenzamide | Ethyl 4-hydroxy-2(p-nitrophenyl)-2-thiazoline-4-acetate | |
| butyric acid | | -2-phenyl-2-thiazoline-5-propionic acid |
| 4-Acetyl-4-bromobutyric acid | p-Methyl-thiobenzamide | 4-Hydroxy-4-methyl-2-(p-tolyl)-2-thiazoline-5-propionic acid |

EXAMPLE 2

Ethyl 2-cyclohexyl-4-hydroxy-4-methyl-2-thiazolin-5-acetate

A solution of cyclohexylthiocarboxamide (7.15 g., 0.05 mol.) in acetone (25 ml.) is added to a solution of ethyl β-acetyl-β-bromo-propionate (11.15 g., 0.05 mol.) in acetone (25 ml.) and the mixture is kept at room temperature for 0.5 hours and then at 0° C. for 3 hours. The while crystalline material is filtered off, washed with acetone and dried to give 6.84 g. (37.6 percent) of the thiazoline ester as its hydrobromide, m.p. 117°–118° C.

Analysis: Found: C, 45.9; H, 6.7; N, 3.8. $C_{14}H_{23}NO_3S.HBr$ requires C, 46.1; H, 6.7; N, 3.9 percent.

In a similar manner, the following reactants give the products indicated:

| Keto-ester | Thioamide | Hydroxy-thiazoline |
|---|---|---|
| Ethyl β-acetyl-β-bromo-propionate | p-Methoxythiobenzamide | Ethyl 4-hydroxy-2-(p-methoxyphenyl)-4-methyl-2-thiazoline-5-acetate |
| Ethyl β-acetyl-β-bromo-propionate | Thiophen-2-thiocarboxamide | Ethyl 4-hydroxy-4-methyl-2-(2-thienyl)-2-thiazoline-5-acetate |
| Ethyl β-acetyl-β-bromo-propionate | Naphthalene-2-thiocarboxamide | Ethyl 4-hydroxy-4-methyl-2-(2-naphthyl)-2-thiazoline-5-acetate |
| Ethyl 4-acetyl-4-bromo-butyrate | Thiobenzamide | Ethyl 4-hydroxy-4-methyl-2-phenyl-2-thiazoline-5-propionate |
| Ethyl 4-acetyl-4-bromo-butyrate | p-Chlorothiobenzamide | Ethyl 2-(p-chlorophenyl)-4-hydroxy-4-methyl-2-thiazoline-5-propionate |

EXAMPLE 3

2-Cyclohexyl-4-hydroxy-4-methyl-2-thiazolin-5-acetic acid

The reaction of cyclohexylthiocarboxamide (7.15 g., 0.05 mol.) and β-acetyl-β-bromopropionic acid (9.75 g., 0.05 mol.) according to the method of Example 2 gives 10.16 g. (60.5 percent) of the thiazoline acid as its hydrobromide, m.p. 129°–130° C.

Analysis: Found: C, 43.1; H, 6.0; N, 4.5C$_{12}H_{19}NO_3S.HBr$ requires C, 42.8; H, 6.0; N, 4.2 percent.

In a similar manner, the following reactants give the products indicated:

| Keto-acid | Thioamide | Hydroxy-thiazoline |
|---|---|---|
| β-Acetyl-β-bromo-propionic acid | p-Dimethylamino-thiobenzamide | 2-(p-Dimethylaminophenyl)-4-hydroxy-4-methyl-2-thiazoline-5-acetic acid |
| β-Acetyl-β-bromo-propionic acid | Furan-2-thiocarboxamide | 2-(2-Furyl)-4-hydroxy-4-methyl-2-thiazoline-5-acetic acid |
| 4-Acetyl-4-bromo-butyric acid | Thiobenzamide | 4-Hydroxy-4-methyl-2-phenyl-2-thiazoline-5-propionic acid |
| 4-Acetyl-4-bromo-butyric acid | p-Methyl-thiobenzamide | 4-Hydroxy-4-methyl-2-(p-tolyl)-2-thiazoline-5-propionic acid |

EXAMPLE 4

Ethyl 4-hydroxy-2-cyclohexyl-2-thiazolin-4-acetate

The reaction of cyclohexylthiocarboxamide (7.15 g., 0.05 mol.) and ethyl 4-bromoacetoacetate (10.41 g., 0.05 mol.) by the method of Example 2 affords 11.0 g. (62.5 percent) of the title compound as its hydrobromide, m.p. 124°–125° C.

Analysis: Found: C, 44.5; H, 6.3; N, 4.05. $C_{13}H_{21}NO_3S.HBr$ requires C, 44.3; H, 6.3; N, 4.0 percent.

EXAMPLE 5

Ethyl 2-p-chlorophenyl-4-hydroxy-2-thiazoline-4-acetate

A solution of p-chlorothiobenzamide (8.59 g., 0.05 mol.) in acetone (40 ml.) is added to a solution of ethyl 4-bromoacetoacetate (10.41 g., 0.05 mol.) in acetone and the mixture is allowed to stand at room temperature for 21 hours. The crystalline material after filtering off and washing with ice-cold acetone and ice-cold ether and drying affords the title compounds (8.05., 42.3 percent) as its hydrobromide, m.p. 97°–98 C.

Analysis: Found: C, 41.0; H, 3.8; N, 3.5. $C_{13}H_{14}ClNO_3S.HBr$ requires C, 41.0; H, 4.0; N, 3.7 percent.

The hydrobromide on treating with sodium hydrogen carbonate gives a 72.8 percent yield of the free base, m.p. 109°–110° C. after recrystallizing from ether.

Analysis: Found: C, 52.1; H, 4.6; N, 4.6. $C_{13}H_{14}ClNO_3S$ requires C, 52.1; H, 4.7; N, 4.7 percent.

In a similar manner the following reactants give the products indicated:

| Keto-ethyl ester | Thioamide | Hydroxy-thiazoline |
|---|---|---|
| 4-Bromo-acetoacetate | p-Methoxythiobenzamide | Ethyl 4-hydroxy-2-(p-methoxy-phenyl)-2-thiazoline-4-acetate |
| 4-Bromo-acetoacetate | p-Dimethylamino-thiobenzamide | Ethyl 4-hydroxy-2-(p-dimethyl-aminophenyl)-2-thiazoline-4-acetate |
| 4-Bromo-acetoacetate | Thiophene-2-thiocarboxamide | Ethyl 4-hydroxy-2-(2-thienyl(-2-thiazoline-4-acetate |
| 4-Bromo-acetoacetate | Furan-2-thiocarboxamide | Ethyl 2-(2-furyl)-4hydroxy-2-thiazoline-4-acetate |
| 4-Bromo-acetoacetate | Naphthaline-2-thiocarboxamide | Ethyl 4-hydroxy-2-(2-naphthyl)-2-thiazoline-4-acetate. |

EXAMPLE 6

4-Hydroxy-2-(p-chlorophenyl)-2-thiazolin-4-propionic acid

The reaction of p-chlorothiobenzamide and 5-bromo-laevulinic acid by the method of Example 2 affords the title compound.

EXAMPLE 7

2-(p-Chlorophenyl)-4-hydroxy-2-thiazoline-4-acetic acid

The reaction of benzyl 4-bromoacetoacetate and p-chlorothiobenzamide affords benzyl 2-(p-chlorophenyl)-4-hydroxy-2-thiazoline-4-acetate which is subsequently hydrogenated in tetrahydrofuran in the presence of an equal weight of 10 percent palladium-on-charcoal catalyst to give the title compound.

The new and novel compounds of the present invention in standard pharmacological test procedures generally demonstrate an ability to reduce inflammation and are useful as agents for the treatment of inflammation.

In the pharmacological evaluation of the properties of the compounds of this invention, the effects in vivo of the compounds are tested in the procedure of Winter et al. and Buttle et al. specified above.

The procedure employed is: Anti-inflammatory activity of a test compound of the invention is assessed by its ability to inhibit experimentally induced edema in the hind paw of male Sprague-Dawley rats weighing 120-165 grams. The compound is administered orally as a solution or suspension in physiological saline (plus 1 drop Tween 80) in a volume of 10 ml./kg. at various concentrations. Each compound is given to six rats and vehicle alone is administered to six other rats as a control. Sixty minutes after drug administration, edema is induced by an injection of 0.05 ml. of a 1 percent carrageenin solution into the subplanter tissue of the rat's right hind paw. Paw volume is then immediately measured volumetrically with a plethysmograph and again after 3 hours. The mean volume of swelling for the control group is calculated and compared to the test groups. Compounds that inhibit swelling approximately 20 percent as compared to controls are active. Inhibition is calculated by the formula:

Percent inhibition $$= \frac{\text{Mean vol. swelling of control} - \text{mean vol. swelling of test} \times 100}{\text{Mean vol. swelling of control}}$$

The compounds of general formula I when administered orally in the above test procedure at a dosage of 10 to 250 mg./kg. depending on the compound in question, generally demonstrated anti-inflammatory activity. Good activity was obtained with ethyl 2-p-chlorophenyl-4-hydroxy-2-thiazoline-4-acetate which gave 53 percent inhibition at 100 mg./kg.

EXAMPLE 8

| Ethyl 2-p-chlorophenyl-4-hydroxy-2-thiazoline-4-acetate | 125 mg. |
| Lactose | 120 mg. |
| Magnesium stearate | 5 mg. |

Capsules of the above were made up by thoroughly mixing together batches of the above ingredients and filling hard gelatine capsules (250 mg.) with the mixture.

EXAMPLE 9

| Ethyl 2-p-chlorophenyl-4-hydroxy-2thiazoline-4acetate | 125 mg. |
| Lactose | 100 mg. |
| Avicel | 30 mg. |
| Dried Maize Starch | 40 mg. |
| Magnesium stearate | 5 mg. |

Tablets of the above composition were made by milling the active ingredient to 40-mesh (British Standard), sieving through a 40-mesh (British Standard) sieve, mixing the milled material with the other components and compressing to form tablets.

What is claimed is:

1. A compound selected from the group consisting of those having the general formula:

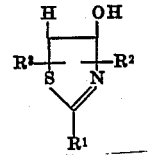

wherein $R^1$ is selected from the group consisting of cyclohexyl, phenyl, monoloweralkylphenyl, monoloweralkoxy-phenyl, monohalophenyl, mononitrophenyl, mono(diloweralkylamino)-phenyl, trifluoromethylphenyl, thienyl, furyl, and naphthyl; $R^3$ is a substituent at the 4- or 5- position and is selected from the group consisting of hydrogen and lower alkyl, and $R^2$ is a substituent at the other of the said 4- and 5- positions and is a radical of the formula $$-(CH_2)_n-CO_2R$$

wherein $n$ is 1 or 2 and $R$ is hydrogen or lower alkyl; and their acid addition salts with pharmaceutically acceptable acids.

2. A compound according to claim 1 which is ethyl 4-hydroxy-2-phenyl-2-thiazoline-4-acetate.

3. A compound according to claim 1 which is ethyl 4-hydroxy-2-cyclohexyl-2-thiazoline-4-acetate.

4. A compound according to claim 1 which is ethyl 4-hydroxy-2-(halophenyl)-2-thiazoline-4-acetate.

5. A compound according to claim 1 which is ethyl 4-hydroxy-2-(trifluoromethylphenyl)-2-thiazoline-4-acetate.

6. A compound according to claim 1 which is ethyl 4-hydroxy-2-tolyl-2-thiazoline-4-acetate.

7. A compound according to claim 1 which is ethyl 4-hydroxy-2-nitrophenyl-2-thiazoline-4-acetate.

8. A compound according to claim 1 which is 2-halophenyl-4-hydroxy-2-thiazoline-4-acetic acid.

9. A compound according to claim 1 which is ethyl 4-hydroxy-2-(p-methoxyphenyl)-2-thiazoline-4-acetate.

10. A compound according to claim 1 which is 2-halophenyl-4-hydroxy-2-thiazoline-4-propionic acid.

* * * * *